United States Patent [19]

Yezrielev et al.

[11] Patent Number: 5,034,154
[45] Date of Patent: Jul. 23, 1991

[54] SOLVENT MIXTURE FOR PRODUCTION OF HIGH SOLIDS ACRYLIC COATING RESINS

[75] Inventors: Albert I. Yezrielev, Kendall Park, N.J.; Michael G. Romanelli, Brooklyn, N.Y.; William E. Wellman, Edison; Richard H. Schlosberg, Bridgewater, both of N.J.

[73] Assignee: Exxon Chemical Patents Inc., Linden, N.J.

[21] Appl. No.: 220,587

[22] Filed: Jul. 18, 1988

Related U.S. Application Data

[62] Division of Ser. No. 807,585, Dec. 11, 1985, Pat. No. 4,758,642.

[51] Int. Cl.$^5$ .................................. B01F 1/00
[52] U.S. Cl. ........................ 252/364; 252/182.18; 526/216; 526/398.2; 526/348.3
[58] Field of Search .................. 252/182.18, 364; 526/216, 348.2, 348.3

[56] References Cited

U.S. PATENT DOCUMENTS

| 3,325,458 | 6/1967 | Kim | 260/80 |
|---|---|---|---|
| 3,404,127 | 10/1968 | Merijan et al. | 260/47 |
| 3,647,771 | 3/1972 | Nakagachi | 260/86 |
| 3,755,237 | 8/1973 | Isaacs et al. | 260/29 |
| 3,755,272 | 8/1973 | Blank | 260/80 |
| 3,954,720 | 5/1976 | Spoor | 526/75 |
| 4,107,418 | 8/1978 | Yatsu et al. | 526/184 |
| 4,184,993 | 1/1980 | Singh et al. | 260/31 |
| 4,359,325 | 11/1982 | Dawans et al. | 44/62 |
| 4,419,106 | 12/1983 | Miller | 44/62 |
| 4,503,182 | 3/1985 | Durand et al. | 524/474 |

FOREIGN PATENT DOCUMENTS

| 54139 | 3/1982 | European Pat. Off. . |
| 47009 | 10/1982 | European Pat. Off. . |
| 47788 | 4/1979 | Japan . |
| 1314423 | 4/1973 | United Kingdom . |
| 1395501 | 5/1975 | United Kingdom . |

Primary Examiner—Joseph L. Schofer
Assistant Examiner—Peter D. Mulcahy

[57] ABSTRACT

According to one aspect of the present invention, an improved method for preparing acrylic copolymer resins is provided in which the polymerization solvent includes an internal olefin. The monomers comprise hydroxy-substituted alkyl (meth)acrylates, and non-hydroxy substituted alky (meth)acrylates, and the process provides an improved method for forming low molecular weight acrylic resins useful as components in high solids acrylic coatings suitable for electrostatic spraying. The polymerization solvent can remain in the resin to become the solvent employed in the higher solids coating containing the thus-forming acrylic resins and provides surprisingly improved electrical resistivity and color decreased over previously used polymerization solvents, and has good compatibility with the acrylic monomer/resin system.

18 Claims, No Drawings

SOLVENT MIXTURE FOR PRODUCTION OF HIGH SOLIDS ACRYLIC COATING RESINS

This application is a divisional application of U.S. application Ser. No. 07/807,585, filed Dec. 11, 1985, now U.S. Pat. No. 4,758,642.

BACKGROUND OF THE INVENTION

1. Field of the Invention

This invention relates generally to a process for making acrylic coating resins and more specifically to superior solvents useful in the synthesis of high solids acrylic coating resins.

2. Description of the Prior Art

A large variety of acrylic coating compositions are known. Low solids coatings, i.e., those containing about 18 to 40 wt % solids and the balance solvents, have heretofore been developed in which the resins themselves are characterized by high molecular weights, e.g., molecular weights in the range of 20,000 to 40,000. Such high solvent concentrations are required with these high molecular weight resins in order to supply flowability and other properties necessary for ease in applying a uniform coating. Due to strict air pollution regulations, pollution abatement of solvents is of paramount importance. To this end, the industry has expended much effort in an attempt to develop electrostatically sprayable coatings containing high solids contents; that is, coatings having a lower amount of solvents in order to satisfy pollution regulations. Attempts to achieve high solids coatings by merely using more of the conventional high molecular weight resins in the coatings have not been successful since the increased solids content using these resins results in an unacceptably high viscosity, and often the larger amounts of the resins cannot themselves be dissolved. Efforts at developing a "super solvent" for these conventional high molecular weight resins have also not proved to be successful. One prior art approach has been to formulate coatings containing low molecular weight resins (e.g., of about 1,000 to 7,000 weight average molecular weight) in high solids coatings in order to reduce the amount of solvents necessary in the blending for coating applications and, hence, the pollution difficulties associated with the solvents themselves. After application of these coatings to a surface, these coatings are cured to form a polymeric network of higher molecular weight and enhanced physical properties. These high solids acrylic coatings are useful as exterior finish for automobiles, trucks, metal furniture, and as an appliance finish.

K. K. Mitra, "Electrostatic Application of Paint", *Paint India*, vol. 29, no. 9, pp. 52–56 (1979) indicates that while non-polar solvents (aliphatic and aromatic hydrocarbons chlorinated solvents, terpenes, etc.) can be employed in electrostatically sprayable paints to increase bulk and resistivity, polar solvents are used to control resistivity. The polar group is said to include ketones, alcohols, esters, ethers, ether alcohols, and nitro paraffins, etc. The non-polar group is said to include aliphatic and aromatic hydrocarbons, chlorinated solvents, terpenes, etc.

Also illustrative of prior art, high solids acrylic resins are those disclosed in U.S. Pat. No. 4,276.212 and in European Patent Applications 27,719; 29,594 and 29,683.

Solvents which are indicated to be typical in these references (e.g., those mentioned in European Patent Application 29,594) are: Toluene, xylene, butyl acetate, acetone, methyl isobutyl ketone, methyl amyl ketone, methyl ethyl ketone, butyl alcohol and other aliphatic, cycloaliphatic and aromatic hydrocarbons, esters, ethers, ketones, and alcohols.

In a brochure entitled "Hexyl Acetate for the Coatings Industry" (Enjay Chemical Company), published prior to 1980, use of hexyl acetate as coating solvent in certain specific low solids acrylic coating compositions; in urethane coatings in nitrocellulose coatings; and in baking enamels was disclosed.

U.S. Pat. Nos. 4,075,242 and 4,276,432 disclose the preparation of acrylic-based resins by use of polymerization media containing certain high boiling solvents and disclose the use of ethylene and propylene as co-monomers.

European Patent 29,339 discloses the formation of bifunctional copolymers in which the monomers comprise from 5 to 25 wt % of monoethylenically unsaturated monomers having a glycidyl functionality, from 5 to 25% of monoethylenically unsaturated monomers having hydroxy functionality and 90 to 70 wt % of other monoethylenically unsaturated monomers, with acrylates as well as mixtures of acrylates and vinyl hydrocarbons being preferred. Only monovinyl aromatic hydrocarbons are particularly indicated as useful (e.g., styrene, alpha-methyl styrene, vinyl toluene, t-butyl styrene and chlorostyrene).

U.S. Pat. No. 4,369,296 relates to the production of methyl methacrylate homopolymers (or copolymers with certain copolymerizable vinyl monomers; e.g., styrene and alkyl-substituted styrene) in the presence of from 0.01 to 10 wt % of enol ethers derived from aliphatic or cycloaliphatic aldehydes and ketones.

U.S. Pat. No. 3,271,375 relates to the use, in combination with a free radical polymerizable material, of certain unsaturated heterocyclic organic compounds as molecular weight regulators. The prior art has sought to control the degree of polymerization via chain transfer content (in the preparation of acrylic oligomers for high solids coating resins) by use of relatively inactive solvents such as alkyl aromatics, high boiling ethers and benzyl alcohol. D. Rhum, et al., *J. Coatings Tech'n.* Vol. 55, no. 703, 75–79 (August 1983).

U.S. Pat. No. 4,532,294 relates to the preparation of acrylic copolymer resins employing polymerization solvents comprising certain alkanoic acid alkyl esters together with hydroxy-substituted alkyl (meth)acrylate and non-hydroxy substituted alkyl (meth)acrylate monomers, and in optional presence of additional monomers comprising monovinyl aromatic hydrocarbons. Among the non-hydroxy substituted alkyl (meth)acrylate monomers which may be employed are (meth)acrylates as well as mixtures of acrylates and vinyl hydrocarbons.

U.S. Pat. No. 3,926,925 relates to novel interpolymers containing an olefin (an alpha-olefin, a 2-alkyl-1-olefin and a vinyl aromatic), polar monomers, such as an alkyl acrylate, and a fumarate ester or a maleic acid derivative which are prepared with a catalyst system of an alkyl aluminum halide and an organic peroxide. U.S. Pat. No. 3,959,225 relates to a thermally-staged process for preparing alternating interpolymers of one or more polar monomers and one or more mono- or polyolefins in which a polar monomer-Lewis Acid complex is reacted with an olefin in the presence of an active oxygen compound. The olefins discussed as useful in U.S. Pat. No. 3,959,225 are certain Type I olefins and Type III olefins.

U.S. Pat. No. 3,968,148 relates to oligomers of 1-alkenes and derivatives of acrylic acids.

SUMMARY OF THE INVENTION

According to one aspect of the present invention, an improved method for preparing low molecular weight acrylic copolymer resins is provided in which the polymerization is conducted in the presence of a polymerization solvent comprising a mixture of an organic solvent for the resins and at least one internally olefinically unsaturated aliphatic or cycloaliphatic hydrocarbon having from 6 to 16 carbon atoms per molecule. The monomers comprise a mixture of hydroxy-substituted alkyl (meth)acrylates and nonhydroxy substituted alkyl (meth)acrylates, and the process provides an improved method for forming low molecular weight acrylic resins which are useful as components in high solids acrylic coatings suitable for electrostatic spraying. The internal olefin-containing polymerization solvent can remain with the resin to become components of the higher solids coating formulation containing the thus-formed acrylic resins and can provide surprisingly improved color and odor properties, and can also provide improved electrical resistivity and solvency and decreased surface tensions.

It has been further surprisingly found that the process of this invention permits formation of such improved properties even when the polymerization is conducted in the presence of a non-inert atmosphere (e.g., air).

In addition, the solvents of this invention provide the low-molecular weight acrylic resins over a wide range of temperatures. Surprisingly, the solvents of this invention produce low molecular weight acrylic copolymers which are characterized by superior molecular weight and viscosity properties, and are therefore especially suited for use in high solids coatings. The coatings thereby formulated have excellent flow properties, higher resistivities than prior art coatings containing ketones and when applied to surfaces provide high gloss and high impact strength in the as-applied coating.

DETAILED DESCRIPTION OF THE INVENTION

According to one aspect of the improved process of this invention, improved acrylic polymers are prepared by contacting under polymerizing conditions at least one hydroxy-substituted alkyl (meth)acrylate monomer and at least one non-hydroxy substituted alkyl (meth)acrylate monomer in the presence of a free radical polymerization catalyst, and a polymerization solvent comprising an organic solvent for said monomers and at least one internal olefin having from 6 to 16 carbon atoms per molecule.

The organic solvents which can be employed comprise at least one member selected from the group consisting of ketones, ethers, glycols, glycol ethers, esters, keto ethers, ether esters, alcohols, nitrosubstituted paraffins, aromatic solvents and halocarbon solvents. The organic moiety to which the ketone, and ether functional groups can be attached includes alkyl, typically about $C_1$ to $C_{20}$, preferably about $C_1$ to $C_{10}$, most preferably about $C_1$ to $C_5$ alkyl; aryl, typically about $C_6$ to $C_{14}$, preferably about $C_6$ to $C_{10}$, most preferably $C_6$ aryl; cycloalkyl, typically about $C_4$ to $C_{20}$, preferably about $C_6$ to $C_{12}$, most preferably about $C_6$ to $C_{10}$ cycloalkyl; aralkyl and alkaryl wherein the alkyl and aryl groups thereof are described above. Nitro-paraffinic solvents include $NO_2$-substituted alkanes of 2 to 5 carbon atoms.

Halocarbon solvents include chloro- and fluorosubstituted saturated hydrocarbons. Alcohol solvents include alkanols of 4 to 10 carbon atoms, and phenylsubstituted alkanols of 7 to 10 carbon atoms. Ether alcohols include alkoxy-substituted alkanols of from 3 to 8 carbon atoms. Glycol solvents include di-hydroxy substituted alkanes of from 2 to 6 carbon atoms. Glycol ether solvents include compounds of the formula $R'—O—R''$ wherein $R'$ is alkyl of from 1 to 6 carbon atoms and $R''$ is hydroxy-substituted alkyl of from 2 to 6 carbon atoms.

Suitable ester solvents comprise normally liquid $C_1$ to $C_{13}$ alkyl esters of alkanoic acids having from 2 to 7 carbon atoms. Prepared ester solvents are those selected from the group consisting of compounds having the formula (I):

wherein $R^1$ is a straight or branched chain alkyl of from 1 to 6 carbon atoms, and $R^2$ is a straight or branched chain alkyl of from 1 to 13 carbon atoms, with the proviso that $R^1$ and $R^2$ together contain from 6 to 17 carbon atoms, and mixtures thereof. The "$R^1$" group can also comprise $C_2$ to $C_7$ alkyl having one carbon replaced by an ether oxygen (e.g., $C_2H_5—O—C_2H_4—$, $C_3H_7—O—C_2H_4—$, $CH_3—O—C_2H_4—$, $C_2H_5—O—C_3H_6—$, and the like). Exemplary of such ester solvents are butyl acetates, pentyl acetates, hexyl acetates, pentyl propionates, isobutyl isobutyrate, heptyl acetates, methyl pentanoates, ethyl pentanoates, pentyl pentanoates, ethyl hexanoates, butyl hexanoates, ethyl neopentanoate, methyl neoheptanoate, octyl acetates, nonyl nonyl acetates, decyl acetates, undecyl acetates, acetates, dodecyl acetates, tridecyl acetates and the like. Exemplary of esters wherein the carboxylic acid moiety is derived from an ether-containing-containing acid (e.g., acids which are alkoxy-substituted) are ethyl 3-ethyoxypropionate, butyl 3-butoxypropionate, methyl 2-methoxyacetate, methyl 3-methoxypropionate, propyl 3-propoxypropionate and the like.

Especially preferred ester solvents of this invention are normally liquid esters selected from the group consisting of compounds of the formula (II):

wherein $R^3$ is a straight or branched-chain alkyl having from 5 to 13 carbon atoms, and mixtures thereof. Exemplary of such preferred ester solvents herein are pentyl acetates, hexyl acetates, heptyl acetates, octyl acetates, nonyl acetates, decyl acetates, undecyl acetates, dodecyl acetates, and tridecyl acetates. The term "normally liquid esters" as used herein is intended to refer to esters which are in the liquid state at ambient conditions (25° C., 1 atm).

Suitable ketone solvents include methyl amyl ketone, methyl isobutyl ketone, methyl propyl ketone, isophorone, cyclohexanone, diethyl ketone, dibutyl ketone, methyl isopropyl ketone, methyl sec-butylketone, benzophenone, mixtures thereof, and the like. Suitable ether solvents include dibutyl ether, tetrahydrofuran, anisole, dioctyl ether, 1,2-dimethoxyethane, 1,4-dimethoxybutane. Suitable halocarbon solvents include 1,1,2-trichloroethane, tetrachloroethane and the like. Suitable nitroparaffinic solvents include nitropropane and nitropentane. Suitable alcohols include 2-ethyl hexanol, diacetone alcohol, n-butyl alcohol, phenethyl alcohol, benzyl alcohol, amyl alcohol, isobutyl alcohol, tertiary butyl alcohol, hexyl alcohols, and the like. Suitable glycol ethers, esters and mixed ether and ester solvents include ethylene glycol diacetate, propylene glycol diacetate, Cellosolve ® acetate (registered trademark of the Union Carbide Corporation), butyl Cellosolve, Cellosolve, the Carbitols ® (registered trademark of the Union Carbide Corporation), methoxy propyl acetate, ethoxy propyl acetate, and the like. Suitable keto ethers include molecules of the formula (IIa):

$T^1$ and $T^2$ are each hydrocarbyl containing from about 1 to 10 carbon atoms, and $T^3$ is straight or branched chain alkyl of from 1 to 6 carbon atoms. Illustrative of such keto ethers are $CH_3C(O)CH_2CH_2OCH_2CH_3$; $C_3H_7C(O)—C_3H_6OC_3H_7$; $CH_3C(O)CH_2C(OCH_3)(CH_3)CH_3$; $CH_3C(O)CH_2C(OC_2H_5)(CH_3)CH_3$; $C_2H_5C(O)CH_2CH_2OC_4H_9$; and the like. Suitable aromatic solvents comprise alkyl-substituted benzenes of the formula (III):

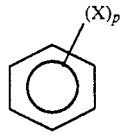

wherein p is an integer of from 1 to 4, and X is in each instance in which it appears independently selected from the group consisting of straight and branched-chain alkyl of from 1 to 4 carbon atoms.

Illustrative of suitable alkyl-substituted benzene solvents for use in the solvent blends of this invention are toluene, xylene, cumene, alkyl-substituted benzenes in which the alkyl substituent comprises a total of at least 2 carbon atoms when the benzene ring is mono-alkyl substituted and of at least 3 carbon atoms when the benzene ring is substituted by two or more alkyl groups, aromatic groups substituted by a cyclic aliphatic ring (e.g., tetrahydronaphthalene), ethyl benzene, isopropyl benzene, n-propyl benzene, 1-methyl-3-ethylbenzene, 1-methyl-4-ethylbenzene, 1,3,5-trimethylbenzene, 1-methyl-2-ethylbenzene, 1,2,4-trimethylbenzene, isobutylbenzene, sec-butylbenzene, 1-methyl-3-isopropylbenzene, 1-methyl-4-isopropylbenzene, 1,2,3-trimethylbenzene, 1-methyl-2-isopropylbenzene, 1,3-diethylbenzene, 1-methyl-3-n-propylbenzene, n-butylbenzene, 1,4-diethylbenzene, 1,3-dimethyl-5-ethylbenzene, 1,4-dimethyl-2-ethylbenzene, 1,3-dimethyl-4-ethylbenzene, 1,2-dimethyl-4-ethylbenzene, 1,2,4,5-tetramethylbenzene, 1,2,3,5-tetramethylbenzene and the like, and mixtures of the foregoing.

The aromatic solvent component can also contain up to about 50 wt %, preferably less than about 40 wt %, and more preferably up to about 25 wt %, of other hydrocarbon solvents such as $C_6$ to $C_{11}$ aromatic solvents not satisfying the definition of formula III above, as well as $C_6$ to $C_{11}$ saturated aliphatic and cycloaliphatic hydrocarbons.

The organic solvents are preferably characterized by a normal boiling point (at 1 atm) of at least about 100° C., more preferably from about 115° to 250° C., and most preferably from about 150° to 200° C,. When the thus-polymerized resins are intended for use as components of electrostatic spray coatings, the organic solvents are preferably characterized by a resistivity of at least 15 megohms, as determined by Ransburg resistivity meter, and are also preferably substantially free of water (more preferably having a water content of less than 0.5 wt %) and trace metals (more preferably having a trace metals content of less than 0.004 wt %).

The internal olefins suitable in this invention as a component of the polymerization solvent comprise normally liquid aliphatic and cycloaliphatic internal olefins having from 6 to 16 carbon atoms per molecule. The term "normally liquid", when applied herein to such internal olefins, is intended to refer to internal olefins which are in the liquid state at ambient conditions (25° C., 1 atm). Suitable internal aliphatic olefins are branched and straight chain olefins with internal olefinic unsaturation, and comprise compounds of the formula (IV):

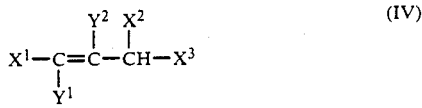

wherein $X^1$ and $Y^2$ are the same or different and H or alkyl of from 1 to 12 carbon atoms, $X^2$ and $X^3$ are the same or different and are H, alkyl of from 1 to 12 carbon atoms or phenyl, and $Y^1$ is alkyl of from 1 to 13 carbon atoms, with the proviso that each molecule of the olefin contains a total of from 6 to 16 carbon atoms.

A preferred class of olefins for use in this invention are cycloaliphatic olefins of from 6 to 12 carbon atoms and aliphatic olefins of the formula (V):

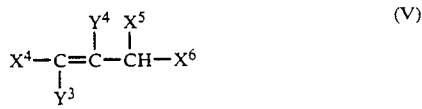

wherein $X^4$, $X^5$, $X^6$ and $Y^4$ are the same or different and are H or alkyl of from 1 to 10 carbon atoms and wherein $Y^3$ is alkyl of from 1 to 11 carbon atoms, with the proviso that each molecule of the olefin contains a total of from 8 to 14 carbon atoms.

Such alkyl groups of formulae (IV) and (V) may be branched or straight chained, and exemplary thereof are methyl, ethyl, n-butyl, iso-butyl, sec-butyl, tert-butyl, n-pentyl, iso-pentyl, hexyl, heptyl, octyl, nonyl, decyl, undecyl, dodecyl, tridecyl, and the like. Exemplary of suitable internal aliphatic olefins, therefore, are 2-hexene, 3-hexene, 2-heptene, 3-heptene, 2-methyl-2-pentene, 3-ethyl2-pentene, 2-, 3- and 4-octene, 3-methyl-2-heptene, 4-propyl-3-heptene, 2-, 3-, and 4-nonene, 2-methyl-4-heptene, 2-, 3-, 4-, and 5-decene, 2-, 3-, 4-, and 5-undecene, 2-, 3-, 4-, 5-, and 6-dodecene, the internally unsaturated tridecenes, tetradecenes, pentadecenes and hexadecenes, and the like. Such alkyl groups of formulae (IV) and (V) may also be phenyl-substituted; e.g., phenyl methyl, 2-phenyl ethyl, 3-phenyl butyl and the like.

Suitable cycloaliphatic olefins are cycloalkenes of from 6 to 16 carbon atoms, of which cyclohexene, cyclooctene, cyclodecene, cyclododecene and the like are illustrative.

Particularly preferred are mixed aliphatic internal olefins commercially produced by olefin oligomerization, such as mixed octenes, nonenes, decenes, undecenes, dodecenes, and tridecenes produced by conventional oligomerization of lower olefin streams (e.g., mixed propylene, butene and pentene olefins derived from catalytic cracking of petroleum hydrocarbons) over electrophilic catalysts; e.g., supported phosphoric acid catalysts. These mixed olefins are predominantly internally unsaturated (e.g., at least about 80 mol % internally unsaturated) and are highly branched.

The selected internal olefin will preferably be characterized by a normal boiling point (i.e., at 1 atm) of at least about 100° C., more preferably from about 115° to 250° C., and most preferably from about 150° to 200° C. The internal olefin will also preferably be substantially free of water and trace metals, as discussed above for the organic solvent, when the resins to be formed are intended for use as a component of electrostatic spray coatings.

In order to form resins of improved color, it is preferred that the internal olefin be substantially free of contamination by conjugated olefinic impurities comprising conjugated diolefins, internally unsaturated monoolefins in which the olefinic double bond is conjugated with an aromatic ring (e.g., as in indene) and internally unsaturated monoolefins which are alpha, beta-unsaturated ketones, esters, amides and acids. More preferably, the internal olefin contains less than 100 ppm of the conjugated olefinic impurities.

The polymerization solvent systems of this invention therefore comprise a mixture of at least one organic (non-olefinically unsaturated) solvent for the monomers and at least one of the above normally liquid internally unsaturated olefins. The organic solvent will generally comprise a majority of the polymerization solvent. More specifically, the polymerization solvents of this invention will comprise from about 50 to 99 wt %, more preferably from about 60 to 95 wt %, and most preferably from about 70 to 90 wt % of the non-olefinic organic solvent, and from about 50 to 1 wt %, more preferably 40 to 5 wt %, and most preferably from about 30 to 10 wt % of the internal olefin component.

Especially preferred such polymerization solvent mixtures are those wherein the organic solvent component comprises from about 60 to 95 wt % of a normally liquid ester of formula (II) above and from about 5 to 40 wt %, of an internal olefin of formula (V) above.

The hydroxy-substituted alkyl (meth)acrylates which can be employed as monomers comprise members selected from the group consisting of the following esters of acrylic or methacrylic acid and aliphatic glycols: 2-hydroxy ethyl acrylate, 3-chloro-2-hydroxypropyl acrylate; 1-hydroxy-2-acryloxy propane; 2-hydroxypropyl acrylate; 3-hydroxypropyl acrylate; 2,3-dihydroxypropyl acrylate; 3-hydroxy-butyl acrylate; 2-hydroxybutyl acrylate; 4-hydroxybutyl acrylate; diethyleneglycol acrylate; 5-hydroxypentyl acrylate; 6-hydroxyhexyl acrylate; triethyleneglycol acrylate; 7-hydroxyheptyl acrylate 1-hydroxy-2-methacryloxy propane; 2-hydroxy-propyl methacrylate; 3-hydroxypropyl methacrylate; 2,3-dihydroxypropyl methacrylate; 2-hydroxybutyl methacrylate; 3-hydroxy-butyl methacrylate; 2-hydroxyethyl methacrylate; 4-hydroxybutyl methacrylate; 3,4-dihydroxybutyl methacrylate; 5-hydroxypentyl methacrylate; 6-hydroxyhexyl methacrylate; 1,3-dimethyl-3-hydroxybutyl methacrylate; 5,6-dihydroxyhexyl methacrylate; and 7-hydroxyheptyl methacrylate. Although one of ordinary skill in the art will recognize that many different hydroxy-substituted alkyl (meth)acrylates including those listed above could be employed, the preferred hydroxy functional monomers for use in the resin of this invention are hyroxysubstituted (meth)acrylates, meaning alkyl acrylates and methacrylates having a total of 5 to 7 carbon atoms, i.e., esters of $C_2$-$C_3$ dihydric alcohols and acrylic or methacrylic acids.

Most preferably, the hydroxy-substituted alkyl (meth)acrylate monomer comprises a compound of the formula (VI):

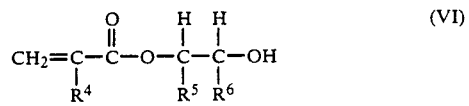

wherein $R^4$ is hydrogen or methyl and $R^5$ and $R^6$ are independently selected from the group consisting of hydrogen and alkyl of from 1 to 6 carbon atoms. Illustrative of these particularly suitable hydroxysubstituted alkyl (meth)acrylate monomers are 2-hydroxy ethyl methacrylate, 2-hydroxyethyl acrylate, 2-hydroxypropyl acrylate, 2-hydroxybutyl acrylate and 2-hydroxy propyl methacrylate.

Among the non-hydroxy substituted alkyl (meth)acrylate monomers which may be employed as monomers are (meth)acrylates (as before, meaning esters of either acrylic or methacrylic acids). Preferred non-hydroxy unsaturated monomers are esters of $C_1$-$C_{12}$ monohydric alcohols and acrylic or methacrylic acids, e.g., methylmethacrylate, ethylacrylate, butylacrylate, butylmethacrylate, hexylacrylate, 2-ethyl-hexylacrylate, lauryl-methacrylate, glycidyl methacrylate, etc.

Particularly preferred non-hydroxy substituted monomers are compounds selected from the group consisting of monomers of the formula (VII):

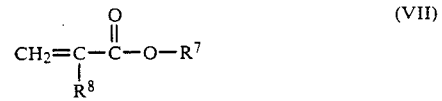

wherein $R^7$ is alkyl of from 1 to 8 carbon atoms and $R^8$ is hydrogen or methyl. Exemplary such monomers are butyl acrylate, butyl methacrylate and methyl methacrylate.

The total monomer mixture can additionally comprise as optional monomers, monovinyl aromatic hydrocarbons containing from 8 to 12 carbon atoms (including styrene, alpha-methyl styrene, vinyl toluene, t-butyl styrene, chlorostyrene and the like), vinyl chloride, vinylidene chloride, acrylonitrile, methacrylonitrile, vinyl acetate, acrylic acid and methacrylic acid.

The total monomer mixture passed to the polymerization process step will generally comprise from about 5 to 40 wt %, and preferably from about 10 to 30 wt %, of the hydroxy-substituted alkyl (meth)acrylate and from about 5 to 95 wt %, preferably from about 30 to 90 wt % of the non-hydroxy substituted alkyl (meth)acrylate monomer, in addition to any optional monomers (discussed above). Generally, the non-hydroxy substituted (meth)acrylate will comprise up to about 90 wt %, more preferably from about 10 to 60 wt %, of the non-hydroxy methacrylate and from about 5 to 70 wt %, more preferably from about 20 to 50 wt %, of the non-hydroxy acrylate, all based on the weight of the total monomer mixture. The non-hydroxy substituted (meth)acrylate will typically comprise a mixture of methyl methacrylate which will be present in an amount of from about 5 to 60 wt %, more preferably from about 10 to 45 wt %, of the total monomer mixture, and up to about 60 wt %, more preferably from about 25 to 50 wt %, of the total monomer mixture of butyl acrylate, 2-ethylhexyl acrylate, or mixtures thereof.

Where employed, the above optional monovinyl aromatic hydrocarbons will be generally present in an amount of from about 2 to 60 wt %, preferably from about 10 to 40 wt % of the total monomer mixture.

In the case of acrylic acid or methacrylic acid, when employed, this monomer will generally be present in an amount of up to 10 wt %, and more typically from about 2 to 5 wt %, of the total monomer mixture. The remaining above-mentioned monomers will generally be present in an amount of up to 30 wt %, more typically from from 3 to 10 wt %, of the monomer mixture, where employed.

In preparing the polymers of this invention, the selected monomers, including the required hydroxy-substituted alkyl (meth)acrylate, and non-hydroxy substituted alkyl (meth)acrylate, together with any modifying or other monomers, may be mixed and reacted by conventional free radical initiated polymerization in such proportions as to obtain the copolymer desired, this reaction being effected in the presence of the polymerization solvent of this invention. A large number of organic free radical initiators are known in the art and are suitable for the purpose. These include: benzoyl peroxide; lauryl peroxide; t-butylhydroperoxide; acetylcyclohexylsulfonyl peroxide; di-isobutyryl peroxide; t-butylperoxypivalate; decanoyl peroxide; azobis-(2-methylpropionitrile); 2-t-butylazo-2-cyanobutane; tertiary butyl perbenzoate, dicumyl peroxide, ethyl 3,3-(t-amylperoxy)butyrate, ethyl 3,3-di(t-butylperoxy) butyrate, t-butyl cumyl peroxide, and di(butyl cumyl) peroxide, and di-t-butyl peroxide, and other dialkyl peroxides, peroxy ketals, and peroxyesters.

The total monomer mixture to be employed in preparing the polymers according to the process of this invention will generally comprise from about 30 to 95 wt %, preferably from about 50 to 90 wt %, of the total mass of monomers and solvent passed to the polymerization reaction vessel. Thus, the polymerization solvents of this invention will generally comprise from about 5 to 70 wt %, preferably from about 10 to 50 wt %, of the total mass of monomers and solvent passed to the polymerization vessel, with the ranges of organic solvent and internal olefin concentrations being as set out in the following Table 1:

TABLE 1

| Concentrations Relative to Total Mass of Monomer and Polymerization Solvent Charged | | |
|---|---|---|
| | Monomers (wt %) | |
| | 30-95 | 50-90 |
| Polymerization Solvent Mixtures (wt %) | 5-70 | 10-50 |
| a. Preferred - | | |
| Organic Solvent (wt %) | 2.5-69.3 | 5-49.5 |
| Internal Olefin (wt %) | 0.05-35 | 0.1-25 |
| b. More Preferred - | | |
| Organic Solvent (wt %) | 3-66.5 | 6-47.5 |
| Internal Olefin (wt %) | 0.25-28 | 0.5-20 |
| c. Most Preferred - | | |
| Organic Solvent (wt %) | 3.5-63 | 7-45 |
| Internal Olefin (wt %) | 0.5-21 | 0.1-15 |

The quantity of free radical initiators employed as catalyst in the reaction can also vary widely and will generally be present in an amount of from about 0.5 to 10 wt % of the total monomer components charged to the reaction mixture.

The conditions of temperature and pressure for conducting the polymerization reaction can vary widely. Generally, the polymerization will be conducted at a temperature of from about 100° to 240° C., (and preferably from about 130° to 210° C.) at atmospheric pressure. Pressures of from about 10 to 500 psig are entirely suitable, although higher or lower pressures can be employed. The polymerization reaction can be carried out in any of the conventional equipment employed by the industry for such reactions. Thus, the reaction vessel can comprise a stirred reactor in which an inert atmosphere (e.g., $N_2$, Ar) is maintained during the polymerization to avoid reactions with gaseous oxygen which compete, or interfere, with the desired polymerization reaction. However, the present invention has also be observed to provide improved high solids resins when the polymerization is conducted in the presence of air, thereby providing a polymerization process which is not critically sensitive to equipment leaks or malfunctions whereby air enters into conventional process equipment.

The polymerization process can be carried out batchwise, semi-continuously, or continuously. The monomers and solvent system can be premixed or passed separately to the polymerization vessel alone, or in combination with the free radical initiators and other components. In addition, the components of the polymerization solvent may be premixed with each other or with any other material to be charged (e.g., with any of the monomers) or may be fed separately to the vessel.

Substantially all of the solvent is added to the reaction flask and is heated to the desired reaction temperature. At this point, an addition of substantially all (i.e., at least about 80 wt %) of the monomer is begun. Minor amounts; i.e., up to about 20 percent, by weight, of the total monomer weight may be placed in the reaction vessel with the solvent. The addition is carried out over at least about 30 minutes. Not all of the monomers need be mixed together; rather, separate additions of different monomers or different ratios of different monomers, may be used. Preferably, the addition time should be in the range of about 1 to 15 hours, most preferably 2 to 6 hours.

The initiators which are utilized in the instant invention may be either mixed with the monomer or added separately over the general period of the monomer addition. In view of the high reaction temperature involved, addition of any major amount of the initiator to the solvent prior to the addition of the monomer will be of little or no effect.

Addition times of both initiators and monomers may vary and the various monomers may be added over regular periods of time, periodically, or over gradually increasing or decreasing periods of time, as long as the total amount of monomer addition is substantially within the ranges indicated.

The initiator should be added to the reaction over at least 30 minutes and preferably over the same or longer period of time that the monomer is added. This can be accomplished, for example, by introducing the initiator to the reaction vessel simultaneously with the monomer feed, followed by the introduction of an additional amount of the initiator (generally from about 5 to 30 wt %) of the total initiator to be charged) with stirring, to bring the polymerization of any remaining monomers to a completion. Initiator levels should vary from about 0.5 percent to 10 percent, based on the total monomer weight, preferably 0.5 to 6 percent.

The time for which the polymerization reaction is allowed to proceed can also vary widely and will generally range from about 0.5 to 15 hours, preferably from about 1 to 6 hours.

Reaction temperature should be maintained within the desired temperature ranges following monomer addition for a time sufficient to cause conversion of all the monomer to polymer. This is usually measured by determining the solids content of the reaction mixture by measuring the amount of solvent that evaporates, when test samples are held for the desired time at the selected elevated temperature (e.g., for about 20 minutes at 220° C.). The term "solids content" does not refer to whether the polymer prepared herein is liquid or solid in nature, but rather refers to the amount of material which is left behind after the evaporation at the above-selected evaporation conditions. Thus, the term "solids content" is synonymous with the term "percent non-volatile matter" or "percent NVM" at the above-selected or other specially indicated evaporation conditions.

At this point, the reaction solvent may be removed by either increasing the heat or applying a vacuum or both. It is preferred that vacuum be utilized in addition to heat to minimize heat degradation of the polymer. Alternatively, and more preferably, the solvent can remain with the polymer resins for formulation of coatings therefrom, as will be described more completely below.

The acrylic resins produced by the process of this invention are liquid in nature and are generally characterized by weight average molecular weights ($M_w$) from about 800 to 15,000, and preferably from about 1,000 to 10,000, and more preferably from about 1,000 to 8,000. Also, the acrylic resins produced by the process of this invention will be generally characterized by number average molecular weights ($M_n$) falling within a range of from about 500 to 8,000, and more typically from about 700 to 5,500, and by $M_w/M_n$ ratios of from about 2 to 5, and more typically from about 2 to 4. Furthermore, the acrylic resins of the present invention will be generally characterized by kinematic viscosities at 65% of NVM of up to 10,000 cs, and more typically from 100 to 5,000 cs (as determined by ASTM D445). These acrylic resins can then be employed in the formulation of coatings with or without the addition of other solvents. The components of such coating compositions formulated using these acrylic resins can be any of the conventional cross-linking agents, catalysts, antioxidants, UV absorbers and stabilizers, surface modifiers, wetting agents as well as pigments. These materials are conventional and a more complete description thereof is not necessary for a full understanding of this invention. For example, illustrative conventional UV absorbers and stabilizers are illustrated by those discussed in European Patent Application 29,594.

The coatings prepared by use of the acrylic resins of this invention can be applied to substrates, such as automobiles and the like, using conventional methods known to the art, such as roller coating, spray coating, electrostatic spray coating, dipping or brushing. Of course, the particular application technique will depend on the particular substrate to be coated and the environment in which the coating operation is to take place. A particularly preferred technique for applying the high solids compositions, particularly when applying the same to automobiles as top coats, is spray coating through the nozzle of a spray gun.

In accordance with another embodiment of the present invention, an improved method for formulating a high solids acrylic resin coating, intended for use e.g. in electrostatic spray applications, is provided wherein the acrylic resin, which is formed by conventional techniques or by use of the aforementioned improved polymerization process using a mixed organic solvent/internal olefin solvent system of this invention, is formulated into a high solids coating by use of a cutting solvent comprising a mixture of any of the aforementioned organic solvents, and at least one of the above-discussed internal olefins. The organic solvent will generally be employed in an amount of from about 5 to about 50 wt % of the as-formulated coating composition, and the internal olefin will generally be employed in an amount of from about 0.1 to 25 wt % of the as-formulated composition, which is preferably formulated to contain high solids (that is, at least about 50 wt % solids) and more preferably from about 50 to 90 wt % solids, and most preferably from about 55 to 80 wt % solids. Exemplary ranges of organic solvent and internal olefin are set out in Table 2 below:

TABLE 2

| Concentrations Relative to Total Mass of Resin and Solvent Employed in Coating Formulation | | |
|---|---|---|
| | Solids (wt %) 50-90 | Solids (wt %) 55-80 |
| Solvent (1) | 10-50 | 20-45 |
| a. Preferred (2) - | | |
| Organic Solvent (wt %) | 5-49.5 | 10-44.6 |
| Internal Olefin (wt %) | 0.1-25 | 0.2-22.5 |
| b. More Preferred (2) - | | |
| Organic Solvent (wt %) | 6-47.5 | 12-42.8 |
| Internal Olefin (wt %) | 0.5-20 | 1-18 |
| c. Most Preferred (2) - | | |
| Organic Solvent (wt %) | 7-45 | 14-40.5 |
| Internal Olefin (wt %) | 1-15 | 2-13.5 |

Notes:
(1) Total Solvent (residual polymerization solvent + cutting solvent).
(2) Relative concentrations of organic solvent and internal olefin in the coating formulation: Preferred: 50-99% organic solvent; 50-1% internal olefin. More Preferred: 60-95% organic solvent; 40-5% internal olefin. Most Preferred: 70-90% organic solvent; 30-10% internal olefin.

As with the previously discussed embodiment of this invention, the acrylic resin and above organic solvent internal olefin coating solvent system of this invention can be employed in combination with any of the conventional cross-linking agents, catalysts, anti-oxidants, UV absorbers and stabilizers, surface modifiers, wetting agents and pigments which are known in the art. These materials, again, are conventional and a more complete description thereof is not necessary for full understanding of this invention. For example, illustrative conventional UV absorbers and stabilizers are those illustrated by the discussion of European Patent Application 29,594 and by the surface modifiers and pigments described in European Patent Application 29,339, the disclosures of which are hereby incorporated by reference.

The novel coating compositions of this invention can be applied to a variety of substrates such as metal, wood, glass, and plastics such as polystyrene, polyurethane and copolymers of styrene, by any of the usual application methods such as by spraying, electrostatic spraying, dipping, brushing, flow coating, rolling and the like. Most preferably, the novel coating compositions of this invention are applied by electrostatic spraying.

The thus-formed coatings can be air-dryed or baked. The resulting coating is preferably from about 0.2 to 3 mils thick, and preferably 0.4 to 2.5 mils thick, and can be rubbed or polished in accordance with conventional techniques, if desired, to improve smoothness or apparent gloss or both.

After the novel coating composition is applied, the coating is preferably cured at about 80° to 210° C., for about 5 to 45 minutes. Typical curing catalysts that can be used are butyl acid phosphate, paratoluene sulfonic acid, naphthalene sulfonic acid, naphthalene di-sulfonic acids and dodecyl benzene sulfonic acid (as described in U.S. Pat. Nos. 3,979,478 and 4,075,176), amine salts of any of the foregoing, and the like.

While the acrylic resins of this invention have been described above for use in coatings, it will also be understood that such low molecular weight resins may be used in any of a varied number of end applications. For example, they may be used as plasticizers for rigid, inflexible polymeric systems. In addition, they may be utilized in combination with conventional curing agents to form films and plastic articles, and as binders and sizers. Examples of the curing agents which may be utilized for preparing cross-linked polymeric products include polyepoxides, di-isocyanates and urea-aldehyde, benzoguanamine-aldehyde, or melamine-aldehyde condensation products and the like. Particularly desired are the melamine-formaldehyde condensation products, such as polymethoxymethyl melamines, preferably the hexamethoxymethyl melamines. When melamine-formaldehyde or urea-formaldehyde curing agents are utilized, it is preferred that an acid catalyst, such as toluene sulfonic acid, be employed to increase the cure rate.

The process and compositions of this invention can be further illustrated by reference to the following examples, wherein parts are by weight unless otherwise indicated.

In the Examples, unless otherwise indicated, the following test procedures or devices were used for determining the corresponding properties:

TABLE 3

| Property Measurement | Test Method/Device |
| --- | --- |
| *Impact resistance (reverse) | ASTM D2794-69 |
| Gloss | ASTM D523 |
| Viscosity | Brookfield model HAT synchro-electric viscometer |
| Pencil Hardness | ASTM D2794-69 |
| Electrical Resistivity | Ransburg 5650 paint resistance tester (manufactured by (Ransburg) |

TABLE 3-continued

| Property Measurement | Test Method/Device |
| --- | --- |
| Film Thickness | (except where indicated) ASTM D1186, modified by use of a Positector 2000 (manufactured by KTA-Tator, Inc.) Magnetic digital thickness meter |
| Color | Pt/Co Scale; Spectrometric measurements using Beckman DB67 grating spectro-photometer (ASTM D1209-79) |

Percent solids reported in the Examples are nominal solids, calculated based on the amount of monomer added to the recited mixtures.

The hexylacetate and heptylacetate used in the Examples were products of an esterification reaction between acetic acid and the corresponding hexyl or heptyl alcohol. The alcohol precursors themselves were formed in a commercial oxo reaction and each comprised a mixture of normal and iso-alcohols. (Similar results would be achieved if pure normal or iso-hexyl or heptyl alcohols were used.)

In the Examples, AROMATIC ™ 100 solvent (manufactured by Exxon Company U.S.A.) comprised a narrow-cut aromatic solvent containing about 40 wt % trimethyl benzenes, 35 wt % methyl ethyl benzenes, 10 wt % propyl and isopropyl benzenes, 3 wt % ethyl dimethyl benzenes, 2 wt % methyl (n- and iso-) propyl benzenes, 2 wt % diethyl benzenes, <1 wt % each of mono butyl benzenes and tetramethyl benzenes, 6 wt % xylenes and minor amounts of ethyl benzene, $C_{10}$ and $C_{11}$ saturates and unknowns. AROMATIC ™ 150 solvent (manufactured by Exxon Company U.S.A.) comprised a narrow-cut aromatic solvent containing about 23 wt % tetra-methyl benzenes, 22 wt % ethyl dimethyl benzenes, 15 wt % mono-, di- and tri-methyl indanes, 8 wt % diethyl benzenes, 8 wt % naphthalene, 5 wt % trimethyl benzenes, 2 wt % indane, and about 1 wt % or less of methyl ethyl benzenes, propyl benzenes, methyl propyl benzenes, butyl benzenes, hexyl benzenes, indene, methyl naphthalenes, xylenes, and unknowns.

In the Examples, unless otherwise indicated, the internal olefins were products (so-called UOP olefins) of conventional olefin oligomerization of mixed propylene, butene and pentene olefins (derived from catalytic cracking of petroleum hydrocarbons) over phosphoric acid catalyst, and each contained at least about 70 mol % of olefins having internal olefinic unsaturation and the balance comprised of alkanes, branched alpha-olefins, cycloalkanes and the like. For example, the $C_{12}$ UOP olefin typically comprises about 93% internal olefins (19% Type II; 39% Type IV; and 35% Type V olefins). The olefin feeds used in the examples are expressed in terms of their average molecular weight. For example, the $C_{12}$ UOP olefin typically comprises about 55-60% $C_{12}$, 25-35% $C_{11}$ and 6-10% $C_{13}$ with minor amounts of $C_{10}$ and $C_{14}$ materials.

Number average molecular weights ($M_n$) and weight average molecular weights ($M_w$) were found by gel permeation, with a polystyrene standard (using a Waters GPC-1 instrument).

Non-volatile matter (NVM) measurements were made in Examples 1-9 and 21-23 by taking a weighed sample of the product resin-polymerization solutions and heating the sample in an aluminum boat at 200° C. for 40 minutes in a vacuum oven (22 mmHg), followed by weighing the residual material (NVM Method I). NVM measurements were made in Examples 11-20 and 24-33 by mixing a weighed sample of the product resin-polymerization solution with sufficient toluene to make a 10:90 wt:wt resin:toluene solution, and thereafter a thin film (about 0.05 mm) was cast and baked one hour at 150° C. in air, followed by weighing the residual material (NVM Method II).

EXAMPLES 1-9

To a four-necked, five liter round bottomed flask fitted with a one liter dropping funnel, a water jacketed reflux condenser, an air driven stirrer (made of 316 stainless steel) and a thermometer, was charged 640g of the selected polymerization solvent. Air was blown into the apparatus at the rate of 8 cc/min, and stirring at 250 RPM was commenced. The solvent was heated over a 0.5 hour period to the selected polymerization temperature. A blend of 480.0 g styrene, 480.0 g butyl acrylate, 240.0 g 2-hydroxyethyl methacrylate and the selected amount of t-butyl perbenzoate as initiator, was placed in the dropping funnel and added to the polymerization solvent with stirring and at the metered air-flow over a three hour period. After all the monomer blend was added, the reaction mixture was stirred for an additional 30 minutes at the reaction temperature. At this point a final amount of 6.0 g of t-butyl perbenzoate in 6.0 g of hexyl acetate was added slowly and the mixture stirred at the selected polymerization temperature for the final two hours. The reaction mixture then was cooled with stirring.

Two control experiments (A and B) were run to determine the color of resins obtained without the use of the internal olefins of this invention, and to illustrate the use of activated carbon to remove color bodies from the hexyl acetate prior to use as a polymerization solvent. In Control A, the above polymerization procedure was used except that no internal olefin was employed. In Control B, the procedure of Control A was repeated except that the hexyl acetate (having an initial Pt/Co color of about 8) was first contacted (with stirring) in a one liter glass flask with 32 g of activated carbon at room temperature for 18 hours, and the treated hexyl acetate was then recovered by filtration and employed as polymerization solvent.

A series of experiments were made and the data is set forth in Table 4 below. The results show the high solids resins produced by the process of this invention in which the polymerization is conducted in the additional presence of an internal olefin.

Immediately after the conclusion of the above experimental procedure in Control A and in Example 1, the odor of the thus-produced resin solutions were compared. It was observed that the resin produced in Example 1 was characterized by a significant decrease in the amount of odor over that possessed by the resin produced in Control A.

TABLE 4

| Ex. No. | Polymerization Solvent Mixture (2) | | | | Resin Properties | | | | | |
|---|---|---|---|---|---|---|---|---|---|---|
| | UOP Internal Olefin | (wt %) | Hexyl Acetate (wt %) | Initiator (wt %) (1) | Polymerization Temp. (°C.) | % NVM | Viscosity (cps) | $M_n$ | $M_w$ | $M_w/M_n$ | Pt/Co Color |
| Control A | — | — | 100 | 6 | 140 | — | 1700 | 2848 | 8185 | 2.87 | 19 |
| Control B | — | — | 100 | 6 | 140 | — | 2200 | 2773 | 8262 | 3 | 15 |
| 1 | Octene | 20 | 80 | 6 | 140 | 64.1 | 1300 | 2413 | 5921 | 2.45 | 14 |
| 2 | Octene | 20 | 80 | 3 | 140 | 65.1 | 2440 | 3778 | 11604 | 3.07 | 14 |
| 3 | Nonene | 20 | 80 | 3 | 140 | 62.9 | 2780 | 4002 | 12229 | 3.06 | 12 |
| 4 | Nonene | 20 | 80 | 3 | 140 | — | 2920 | 4068 | 12022 | 2.96 | 15 |
| 5 | Dodecene (4) | 20 | 80 | 6 | 140 | — | 2640 | 2632 | 6824 | 2.59 | 46 |
| 6 | Nonene | 40 | 60 | 3 | 140 | 61.3 | 2440 | 4614 | 11729 | 2.54 | 15 |
| 7 | Nonene | 40 | 60 | 1 | 140 | 61.1 | 4720 | 9766 | 21069 | 2.16 | 14 |
| 8 | Nonene | 40 | 60 | 3 | 140 | 62.3 | 2880 | 4976 | 13176 | 2.65 | 12 |
| 9 | Nonene | 40 | 60 | 3 | 145 | 60.1 | 2450 | 3541 | 10211 | 2.88 | 11 |

Notes:
(1) Based on total monomer mixture and initiator charged.
(2) Examples 1-5: 512 g hexyl acetate, 128 g olefin charged; Examples 6-9: 384 g hexyl acetate, 256 g olefin; polymerization solvent initially charged in Controls A and B: 640 g hexyl acetate.
(3) Determined by NVM Method I.
(4) Believed to have contained >100 ppm of color forming compounds containing conjugated olefinic bonds.

EXAMPLE 10

The polymerized resins obtained as in Example 1 and Control A were then used (without stripping, or otherwise effecting the removal, of the polymerization solvent) to formulate a series of paint coating compositions, employing the materials identified in Table 5 below:

TABLE 5

| | Run: | | | |
|---|---|---|---|---|
| | 10-1 (Control A) | | 10-2 (Example 1) | |
| Coating Component | Weight (grams) | Wt % | Weight (grams) | Wt % |
| Resin (1) | 1,207.8 | 54.9 | 1,188 | 54.0 |
| AROMATIC 100 ™ Solvent (2) | 129.8 | 5.9 | 129.8 | 5.9 |
| CYMEL 303 (3) | 314 | 14.3 | 314 | 14.3 |
| n-Butanol | 105.6 | 4.8 | 105.6 | 4.8 |
| Hexyl Acetate | 420.2 | 19.1 | 440 | 19.1 |
| BYK Catalyst 451 (4) | 22 | 1.0 | 22 | 1.0 |

TABLE 5-continued

| | Run: | | | |
|---|---|---|---|---|
| | 10-1 (Control A) | | 10-2 (Example 1) | |
| Coating Component | Weight (grams) | Wt % | Weight (grams) | Wt % |
| | 2,199.4 | 100.0 | 2,199.4 | 100.0 |

Notes:
(1) Resin as charged included the polymerization solvent.
(2) Hydrocarbon solvent (Exxon U.S.A.), 8% aromatic solvent (at least 8 or more carbon atoms per molecule), 92% saturated aliphatic hydrocarbons; boiling range 156-204° C.
(3) Hexamethoxymethyl melamine, 100% solid resin (produced by American Cyanamid) as crosslinking amino resin.
(4) p-Toluene sulfonic acid, 30% solution in isopropanol, neutralized with pyridine (Mallincrodt), as cure catalyst.

In each run, the selected resin, together with the remaining Table 5 components (other than the BYK cure catalyst), were placed in a steel container which was then rolled on mill rollers for a time of one half hour. The liquid coating was then filtered using a Gardco paint filter; fine -60X45 mesh to remove gel particles, and then mixed with the cure catalyst to form the paint coating composition. Each paint coating composition was tested to determine its electrical resistivity and viscosity, and then electrostatically sprayed onto panels (fabricated from rolled steel Bonderite® 40 treated steel) using a high speed Turbobell (manufactured by Ransburg; model type: Monobell) at 28,000 rpm, employing a spray voltage of 90,000 volts, a paint feed rate of about 100 ml/min and a spray distance of 13 inches (from the panel to the sprayer). The panels are attached to a conveyor belt and passed by the sprayer at the rate of 12 linear feet per minute. The panels were coated in 2 passes, with 2 minutes between passes, and then allowed to stand for 5 minutes at ambient conditions after which the panels were baked at 300° F. for 30 minutes in an oven.

The data thereby obtained are summarized in Table 6 below:

TABLE 6

| | Run No. | |
|---|---|---|
| | 10-1 | 10-2 |
| | Resin prepared in: | |
| | Example 1 | Control A |
| Properties of Liquid Coating: | | |
| Electrical Resistivity (megohms) | 1.5 | 1.2 |
| Viscosity Zahn #2 (sec) (1) | 27.5 | 26.3 |
| Film Properties (2): | | |
| Gloss - 60° | 99 | 99 |
| Impact Resistance - Direct (in-lbs) | 56 | 56 |
| - Reverse | 4 | 4 |
| Pencil Hardness | H | H |

Notes:
(1) Viscosity determined by ASTM D3794, Zahn Cup #2.
(2) Film properties determined on spray panels.

The coating films were judged by appearance to have a good gloss, and to be free of any visible defects, and were found to have good adhesion to the coating surface.

EXAMPLES 11-20

In a separate series of runs, the procedure of Example 1 was repeated (except that the polymerizations were conducted under $N_2$ and except that the monomer and initiator were fed to the reaction vessel by means of a metered pump, together or separately from the monomer mixture) employing mixtures of heptyl acetate and internal olefin polymerization solvent and employing a monomer mixture comprising 480 g of methyl methacrylate, 480 g of 2-hydroxy ethyl methacrylate, 240 g of styrene, 64 g of acrylic acid, and the selected quantity of n-butyl acrylate, together with the initiators, and in the amounts identified in Table 7 below. Two control experiments were made in which no internal olefin was employed.

TABLE 7

| | Polymerization Solvent | | Olefin | Monomer and Initiator Feed | | | | Added Initiator(5) | | Polymerization | |
|---|---|---|---|---|---|---|---|---|---|---|---|
| | | | | BA | Initiator | | $t_1$ | | | Temp. | $t_3$ |
| Run No. | $C_7OAc$ (g) | Olefin | (g) | Ratio (1) | (g) | Type | (g) | (min) (2) | Type | (g) | (min) (3) | (°C.) | (min) (4) |
| Control C | 950 | — | — | — | 1136 | TBPB | 120 | 180 | TBPB | 18 | 210 | 150 | 345 |
| Control D | 950 | — | — | — | 1136 | TBPB | 120 | 180 | TBPB | 18 | 225 | 160 | 355 |
| 11 | 1032 | Octenes | 240 | 0/100 | 896 | TBP | 24 | 180 | TBP | 12 | 240 | 152 | 330 |
| 12 | 778 | Octenes | 240 | 75/25 | 896 | TBPB | 48 | 220 | — | — | 305 | 159 | 360 |
| 13 | 800 | Nonenes | 240 | 75/25 | 896 | TBP | 48 | 225 | — | — | 305 | 160 | 350 |
| 14 | 600 | Nonenes | 240 | 75/25 | 896 | TBP | 48 | 240 | — | — | 280 | 166 | 340 |
| 15 | 710 | Nonenes | 240 | 100/0 | 1016 | TBP | 48 | 235 | — | — | 250 | 168 | 320 |
| 16 | 740 | Nonenes | 360 | 100/0 | 1016 | TBP | 48 | 235 | — | — | 340 | 155 | 390 |
| 17 | 590 | Nonenes | 360 | 100/0 | 1136 | TBPB | 120 | 180 | TBPB | 18 | 240 | 150 | 360 |
| 18 | 710 | Nonenes | 240 | 100/0 | 1136 | TBPB | 120 | 180 | TBPB | 18 | 220 | 160 | 330 |
| 19 | 770 | Nonenes | 180 | 100/0 | 1136 | TBPB | 120 | 180 | TBPB | 18 | 210 | 159 | 330 |

TABLE 7-continued

| | Polymerization Solvent | | Olefin | Monomer and Initiator Feed | | | | Added Initiator(5) | | | Polymerization | |
|---|---|---|---|---|---|---|---|---|---|---|---|---|
| Run No. | $C_7OAc$ (g) | Olefin | (g) | Ratio (1) | BA (g) | Initiator Type | (g) | $t_1$ (min) (2) | Type | (g) | $t_2$ (min) (3) | Temp. (°C.) | $t_3$ (min) (4) |
| 20 | 710 | Nonenes | 240 | 100/0 | 1136 | TBPB | 120 | 180 | TBPB | 18 | 220 | 159 | 390 |

Notes
$C_7OAc$ = heptyl acetate; octenes and nonenes = predominantly (>80 wt %) internal olefins derived from U.O.P. oligomerization process; BA = n-butyl acrylate; TBP = tert-butyl peroxide; TBPB = tert-butyl perbenzoate.
(1) g. olefin added to flask with heptyl acetate/g. olefin added with monomer mixture.
(2) $t_1$ = time of addition of monomer feed to reaction vessel.
(3) $t_2$ = time at which addition of added initiator was begun (for Controls A and B, and Exs. 11 and 17–20) or time over which total initiator charge was added (Exs. 12–16).
(4) $t_3$ = total polymerization time.
(5) Initiator introduced together with following solvents: Controls C and D, 32 g. AROMATIC 100 ™ solvent and 50 g. heptyl acetate; Examples 12–15, heptyl acetate (254 g., 232 g., 202 g. and 202 g., respectively); Example 16, 62 g. AROMATIC 100 ™ solvent; Example 17, 32 g. AROMATIC 150 ™ solvent and 50 g. heptyl acetate; Examples 18–20, 32 g. AROMATIC 100 ™ solvent and 50 g. heptyl acetate. (TBP added without solvent.)

The polymer resins thereby produced were characterized and the data thereby obtained is summarized in Table 8 below. (The Pt/Co color [36] observed in Example 18 could not be repeated [note Example 20] and was believed due to equipment fouling resulting from the relocation of the test equipment to a new laboratory; Example 13 was performed after the test equipment was reassembled.)

TABLE 8

| | Polymer Molecular Weight | | | Polymer Solution | | |
|---|---|---|---|---|---|---|
| Ex. No. | $M_n$ | $M_w$ | $M_w/M_n$ | NVM (%) (1) | Viscosity (cps) | Color (Pt/Co) |
| Control C | — | — | — | 71.5 | 9120 | 20 |
| Control D | — | — | — | 71.8 | 4770 | 22 |
| 11 | 4473 | 11287 | 2.52 | 61.4 | 7800 | 20 |
| 12 | 3185 | 8881 | 2.79 | 64.6 | 9100 | 11 |
| 13 | 2610 | 6135 | 2.35 | 63.3 | 4230 | 14 |
| 14 | — | — | — | 63.0 | 2460 | 14 |
| 15 | 2013 | 5315 | 2.64 | 66.6 | 3010 | 18 |
| 16 | — | — | — | 67.6 | 18000 | 20 |
| 17 | — | — | — | 73.2 | 10000 | 13 |
| 18 | — | — | — | 71.7 | 5370 | 36 (2) |
| 19 | — | — | — | 71.9 | 4220 | 21 |
| 20 | — | — | — | 72.1 | 6800 | 22 |

Notes:
(1) Determined by NVM Method I (Controls C, D) and NVM Method II (Exs. 11–20).
(2) Hazy solution (believed resulted from contamination) giving invalid color reading.

EXAMPLES 21–23

In a separate series of runs, the procedure of Example 1 was repeated employing the selected polymerization solvents. The data thereby obtained are summarized in Table 9 below:

Therefore, the addition of the indene impurity to the internal olefin in Control G resulted in a significant increase in the Pt/Co color of the final resin, as compared to the Pt/Co color of the resin obtained in Example 23.

The highly branched internal olefin (2,4,4-trimethyl-2-pentene) used in Example 21 was particularly beneficial in these runs in simultaneously lowering the Pt/Co color and the resin viscosity. The comparison of Example 21 with Control H illustrates the beneficial effect on both decreased viscosity and decreased Pt/Co compared to the isomeric alpha-olefin.

EXAMPLES 24–34

To further illustrate the Pt/Co color benefits to be achieved by avoiding the presence of conjugated olefin impurities in the internal olefin polymerization solvent component, a series of runs was made using the procedure of Example 20. In Examples 24–32, the internal olefin comprised a dodecene: $C_{12}$ internal olefin commercially produced by a UOP olefin oligomerization (believed to be contaminated by conjugated olefinic impurities), and the results thereby obtained were compared to cyclododecene in Example 33. In Example 34, the internal olefin comprised a mixture of UOP nonene and the UOP dodecene. The test conditions are summarized in Table 10 and the data obtained are set forth in Table 11. (The data of Controls C and D are repeated for convenience.)

As is shown by the results of Example 33, a 12-carbon atom internal olefin free of such contamination achieves the desired decreased Pt/Co color, whereas the majority of experiments employing the UOP $C_{12}$ olefin did not.

TABLE 9

| | | Hexyl (2) | | | | Resin Properties | | |
|---|---|---|---|---|---|---|---|---|
| Ex. No. | Internal Olefin (2) | (wt %) | Acetate (wt %) | Initiator (wt %) (1) | Polymerization Temp. (°C.) | % NVM (3) | Viscosity (cps) | Pt/Co Color |
| Control E | — | — | 100 | 6 | 140 | 65.7 | 2880 | 28 |
| Control F | — | — | 100 | 6 | 140 | 65.9 | 2060 | 27 |
| Control G | UOP Nonene* | 20 | 80 | 6 | 140 | 65.9 | 2100 | 30 |
| 21 | TMP-2 | 20 | 80 | 6 | 140 | 67.5 | 1850 | 19 |
| 22 | CDD | 20 | 80 | 6 | 140 | 66.5 | 1900 | 28 |
| 23 | UOP Nonene | 20 | 80 | 6 | 140 | 66.5 | 1900 | 22 |

Notes:
TMP-2 = 2,4,4-trimethyl-2-pentene; CDD = cyclododecene.
(1) Based on total monomer mixture and initiator charged.
(2) Examples 21–23 and Controls G and H: 512 g hexyl acetate, 128 g olefin charged. Polymerization solvent charged in Controls E and F: 640 g hexyl acetate.
(3) Determined by NVM Method II.
*Ex. Control G employed UOP olefin (nonene) to which 0.01 wt % (0.064 g) indene was added (based on total solvent mixture) as a suspected color forming compound.

TABLE 10

| Ex. No. | Polymerization Solvent C₇OAc (g) | Olefin | (g) | Olefin Ratio (1) | Monomer and Initiator Feed BA (g) | Initiator Type | (g) | t₁ (min) (2) | Added Initiator (5) Type | (g) | t₂ (min) (3) | Polymerization Temp. (°C.) | t₃ (min) (4) |
|---|---|---|---|---|---|---|---|---|---|---|---|---|---|
| Control C | 950 | — | — | — | 1136 | TBPB | 120 | 180 | TBPB | 18 | 210 | 150 | 345 |
| Control D | 950 | — | — | — | 1136 | TBPB | 120 | 180 | TBPB | 18 | 225 | 160 | 355 |
| 24 | 1032 | Dodecene | 240 | 0/100 | 896 | TBP | 24 | 180 | TBP | 12 | 240 | 160 | 330 |
| 25 | 1032 | Dodecene | 240 | 25/75 | 896 | TBP | 24 | 185 | TBP | 12 | 245 | 159 | 330 |
| 26 | 760 | Dodecene | 360 | 100/0 | 1016 | TBP | 48 | 235 | — | — | 380 | 170 | 380 |
| 27 | 760 | Dodecene | 360 | 100/0 | 1016 | TBP | 48 | 240 | — | — | 395 | 159 | 395 |
| 28 | 760 | Dodecene | 360 | 100/0 | 1016 | TBP | 48 | 240 | — | — | 395 | 170 | 395 |
| 29 | 600 | Dodecene | 360 | 100/0 | 1016 | TBP | 48 | 230 | — | — | 255 | 167 | 255 |
| 30 | 598 | Dodecene | 360 | 100/0 | 1136 | TBP | 48 | 235 | TBP | 6 | 260 | 164 | 365 |
| 31 | 590 | Dodecene | 360 | 100/0 | 1136 | TBPB | 120 | 180 | TBPB | 12 | 240 | 170 | 325 |
| 32 | 590 | Dodecene | 360 | 100/0 | 1136 | TBPB | 120 | 180 | TBPB | 12 | 240 | 150 | 360 |
| 33 | 640 | Cyclo-dodecene | 360 | 65/35 | 1136 | TBPB | 48 | 180 | TBPB | 9 | 185 | 160 | 235 |
| 34 | 570 | Nonene + Dodecene | (6) | 100/0 | 1016 | TBP | 48 | 230 | — | — | 275 | 160 | 305 |

Notes
C₇OAc = heptyl acetate; dodecene = predominantly (>70 wt %) internal olefins derived from U.O.P. oligomerization process; BA = n-butyl acrylate; TBP = tert-butyl peroxide; TBPB = tert-butyl perbenzoate.
(1) g. olefin added to flask with heptyl acetate/g. olefin added with monomer mixture.
(2) t₁ = time of addition of monomer feed to reaction vessel.
(3) t₂ = time at which addition of added initiator was begun (for Exs. 24, 25 and 30–32) or time over which total initiator charge was added (Exs. 26–29 and 34).
(4) t₃ = total polymerization time.
(5) Added initiator introduced together with following solvents: Controls C and D, 32 g. AROMATIC 100 ™ solvent and 50 g. heptyl acetate; Examples 31 and 32, 32 g. AROMATIC 150 ™ solvent and 50 g. heptyl acetate; Example 30, 39 g. AROMATIC 150 ™ solvent and 40 g. heptyl acetate; Example 29, 102 g. AROMATIC 150 ™ solvent and 90 g. heptyl acetate; Examples 26–28, 32 g. AROMATIC 150 ™ solvent; Example 33, 32 g. AROMATIC 100 ™ solvent; Example 34, 132 g. AROMATIC 150 ™ solvent, 90 g. heptyl acetate. (Examples 24–25, TBP added without solvent.)
(6) 180 g. nonene; 180 g. dodecene.

TABLE 11

| | Polymer Molecular Weight | | | Polymer Solution | | |
|---|---|---|---|---|---|---|
| Ex. No. | $M_n$ | $M_w$ | $M_w/M_n$ | NVM (%) (1) | Viscosity (cps) | Color (Pt/Co) |
| Control C | — | — | — | 71.5 | 9120 | 20 |
| Control D | — | — | — | 71.8 | 4770 | 22 |
| 24 | 2353 | 9776 | 4.15 | 59.0 | 7100 | 20 |
| 25 | 3850 | 10558 | 2.74 | 62.2 | 7640 | 25 |
| 26 | 2167 | 5315 | 2.45 | 67.1 | 4200 | 38 |
| 27 | 2811 | 9995 | 3.56 | 67.8 | 14600 | 23 |
| 28 | 1949 | 6053 | 3.11 | 65.6 | 4380 | 27 |
| 29 | 2011 | 3968 | 1.97 | 66.6 | 4200 | 23 |
| 30 | — | — | — | 69.5 | 7100 | 22 |
| 31 | — | — | — | 73.5 | 4340 | 35 |
| 32 | — | — | — | 72.9 | 6930 | 16 |
| 33 | — | — | — | 72.3 | 32000 | 18 |
| 34 | 2017 | 6261 | 3.10 | 66.8 | 8600 | 14 |

Notes:
(1) Determined by Controls C and D by NVM Method I and for Exs. 24–34 by NVM Method II.

It will be obvious that various changes and modifications may be made without departing from the invention and it is intended, therefore, that all matter contained in the foregoing description shall be interpreted as illustrative only and not limitative of the invention.

What is claimed is:

1. A solvent composition comprising a mixture of (1) at least about =wt. % of at least one normally liquid ester selected from the group consisting of compounds having the formula:

$$R^1-\overset{O}{\underset{\|}{C}}-O-R''$$

wherein $R^1$ is a straight or branched chain alkyl of 1 to 6 carbon atoms, and $R''$ is a straight or branched chain alkyl of 1 to 13 carbon atoms, with the proviso that $R^1$ and $R''$ together contain from 5 to 17 carbon atoms, and (2) at least about 1 wt. % of at least one normally liquid internal aliphatic or cycloaliphatic olefin having from 6 to 16 carbon atoms per molecule.

2. The solvent of claim 1 wherein said normally liquid olefin comprises at least one member selected from the group consisting of compounds of the formula:

$$X^1-C=C-CH-X^3$$
$$\phantom{X^1-}|\phantom{=C}|\phantom{-CH}|$$
$$\phantom{X^1-}Y^1\phantom{=}Y^2\phantom{-CH}X^2$$

wherein $X^1$ and $Y^2$ are the same or different and are H or alkyl of from 1 to 12 carbon atoms, $X^2$ and $X^3$ are the same or different and are H, alkyl of from 1 to 12 carbon atoms or phenyl, and $Y^1$ is is alkyl of from 1 to 13 carbon atoms, with the proviso that each molecule of the olefin contains a total of from 6 to 16 carbon atoms per molecule.

3. The solvent of claim 1 or 2 wherein said solvent is substantially free of conjugated olefinic impurities.

4. The solvent of claim 1 wherein said at least one normally liquid ester is selected from the group consisting of compounds having the formula:

$$CH_3-\overset{O}{\underset{\|}{C}}-O-R'''$$

wherein $R'''$ is a straight or branched chain alkyl group having from 5 to 13 carbon atoms.

5. The solvent of claim 4 wherein said normally liquid ester is selected from the group consisting of pentyl acetates, hexyl acetates, heptyl acetates, octyl acetates, nonyl acetates, decyl acetates, undecyl acetates, dodecyl acetates, tridecyl acetates, and mixtures thereof.

6. The solvent of claim 5 wherein said normally liquid ester is predominantly hexyl acetate.

7. The solvent of claim 5 wherein said normally liquid ester is predominantly heptyl acetate.

8. The solvent of claim 1 which additionally contains at least one alkyl-substituted benzene solvent.

9. The solvent of claim 8 wherein said alkyl-substituted benzene solvent comprises at least one aromatic compound of the formula:

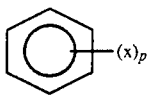

wherein p is an integer from 1 to 4 and x is in each instance in which it appears independently selected from the group consisting of straight and branched chain alkyl of from 1 to 4 carbon atoms.

10. The solvent of claim 2 wherein said normally liquid olefin comprises at least one linear or branched aliphatic olefin having from 8 to 14 carbon atoms per molecule.

11. The solvent of claim 10 wherein said normally liquid olefin comprises internally olefinically unsaturated octenes, nonenes, undecenes, decenes, dodecenes, tridecenes, or mixtures thereof.

12. The solvent of claim 10 wherein said normally liquid olefin comprises 2,4,4-trimethyl-2-pentene.

13. The solvent of claim 1 containing from about 60 to about 95 wt. % of said normally liquid ester and from about 5 to about 40 wt. % of said normally liquid olefin.

14. The solvent of claim 1 having a boiling point of at least about 100° C.

15. The solvent of claim 10 containing from about 60 to about 95 wt. % of said normally liquid alkyl ester selected from the group consisting of pentyl acetates, hexyl acetates, heptyl acetates, octyl acetates, nonyl acetates, decyl acetates, undecyl acetates, dodecyl acetates, tridecyl acetates, and mixtures thereof, and from about 5 to about 40 wt. % of said normally liquid olefin.

16. The solvent of claim 15 wherein said normally liquid olefin comprises internally olefinically unsaturated octenes, nonenes, undecenes, decenes, dodecenes, tridecenes or mixture thereof.

17. The solvent of claim 16 wherein said normally liquid alkyl ester is hexyl acetate.

18. The solvent of claim 16 wherein said normally liquid alkyl ester is heptyl acetate.

* * * * *